United States Patent
Golozar et al.

(10) Patent No.: US 11,428,004 B2
(45) Date of Patent: Aug. 30, 2022

(54) OMNI-DIRECTIONAL SHAPE-MORPHING PANEL MECHANISM

(71) Applicants: Ali Golozar, Kish Island (IR); Farzad Ayatollahzadeh Shirazi, Tehran (IR); Kambiz Ghaemi Osgouie, Rezvan Shahr (IR); Fardad Nasrollahzadeh Khakiani, Tehran (IR); Shahin Siahpour, Shiraz (IR)

(72) Inventors: Ali Golozar, Kish Island (IR); Farzad Ayatollahzadeh Shirazi, Tehran (IR); Kambiz Ghaemi Osgouie, Rezvan Shahr (IR); Fardad Nasrollahzadeh Khakiani, Tehran (IR); Shahin Siahpour, Shiraz (IR)

(73) Assignee: UNIVERSITY OF TEHRAN, Tehran (IR)

( * ) Notice: Subject to any disclaimer, the term of this patent is extended or adjusted under 35 U.S.C. 154(b) by 0 days.

(21) Appl. No.: 17/375,640

(22) Filed: Jul. 14, 2021

(65) Prior Publication Data
US 2021/0340763 A1 Nov. 4, 2021

Related U.S. Application Data

(60) Provisional application No. 63/053,579, filed on Jul. 18, 2020.

(51) Int. Cl.
*E04C 2/40* (2006.01)
*E04B 1/344* (2006.01)
*E04B 7/16* (2006.01)

(52) U.S. Cl.
CPC .............. *E04C 2/405* (2013.01); *E04B 1/344* (2013.01); *E04B 7/163* (2013.01)

(58) Field of Classification Search
CPC .......... E04C 2/405; E04B 1/344; E04B 7/163; B64C 2003/445; F03D 1/04; F05B 2240/13
See application file for complete search history.

(56) References Cited

U.S. PATENT DOCUMENTS

| 3,412,519 | A | * | 11/1968 | Brettingen | .............. E04B 1/344 D25/115 |
| 4,055,019 | A | * | 10/1977 | Harvey | ................ A63H 33/065 446/124 |
| 5,069,948 | A | * | 12/1991 | Fromson | .................. E04B 1/344 428/33 |
| 5,107,652 | A | * | 4/1992 | Sosa | ........................ E04C 1/395 52/586.1 |
| 5,540,013 | A | * | 7/1996 | Diamond | ............... G09B 23/04 52/80.1 |

(Continued)

*Primary Examiner* — Patrick J Maestri
(74) *Attorney, Agent, or Firm* — Bajwa IP Law Firm; Haris Zaheer Bajwa

(57) ABSTRACT

A morphing panel mechanism may include a central panel and a side panel, where a first edge of the side panel may be pivotally coupled to a first edge of the central panel. A morphing panel mechanism may further include a guide panel that may be coupled with a first corner of the central panel via a ball joint, where the guide panel may include a first slit. A morphing panel mechanism may further include a flexible panel, where a first edge of the flexible panel may be pivotally coupled with a second edge of the side panel, and a second edge of the flexible panel may be slidably disposed within the slit of the guide panel.

14 Claims, 17 Drawing Sheets

(56) References Cited

U.S. PATENT DOCUMENTS

| | | | |
|---|---|---|---|
| 10,130,893 B2* | 11/2018 | Heston | A63H 33/084 |
| 2018/0015692 A1* | 1/2018 | Mackie | E04B 1/344 |
| 2019/0249822 A1* | 8/2019 | Katz | F16B 5/0088 |

* cited by examiner

104a

108a

OMNI-DIRECTIONAL SHAPE-MORPHING PANEL MECHANISM

CROSS-REFERENCE TO RELATED APPLICATION

This application claims the benefit of priority from pending U.S. Provisional Patent Application Ser. No. 63/053,579, filed on Jul. 18, 2020, and entitled "MORPHING OMNI DIRECTIONAL PANEL MECHANISM," which is incorporated herein by reference in its entirety.

TECHNICAL FIELD

The present disclosure generally relates to panel mechanisms made of a plurality of sub-panels and particularly relates to a shape-morphing panel mechanism. More particularly, the present disclosure relates to an omni-directional shape-morphing panel mechanism.

BACKGROUND

Morphing structures are highly manipulatable load-bearing mechanisms that are capable of changing shape in response to changes in operating conditions to improve aerodynamic performance of a system, in which such morphing structures are utilized. The geometry and shape of an aerodynamic or hydrodynamic structure plays an important role in determining lift and drag characteristics of an aerodynamic or hydrodynamic structure. Consequently, aerodynamic properties of a structure may be manipulated by manipulating the geometry of that structure.

Many approaches have been taken to develop capable morphing structures with highly manipulatable geometries. For example, one approach is to design morphing structures that utilize flexible and stretchable covers in their structure. However, in aerodynamic or hydrodynamic applications, rippling, sagging, and folding of flexible covers may hinder performance due to the fact that such external surface deformities may adversely affect lift and drag characteristics of that aerodynamic or hydrodynamic structures.

One way to address such performance hinderance due to rippling and sagging of flexible covers is to use rigid covers. For example, morphing mechanisms may be developed that utilize discretized rigid panels that may slide among each other or may utilize an origami concept in which a single rigid panel is folded strategically. Morphing structures developed based on Origami include a flat material that may be manipulated into a three-dimensional structure through strategic folding. Another approach may be developing morphing mechanisms based on kirigami concept in which both cutting and folding a flat material may be utilized to manipulate such flat material into a desired three-dimensional structure.

One drawback of utilizing only rigid covers in development of morphing mechanisms is the limited shape-morphing capabilities of such rigid mechanisms in comparison with flexible structures. Some researchers have tried to combine rigid and flexible covers to address the limited shape-morphing capabilities and thereby increase the level of manipulability of a morphing structure. For example, in some morphing structures, flexible panels are utilized in between rigid panels, but as mentioned before, in aerodynamic and hydrodynamic applications, folding of such flexible panels between the rigid panels may be a hinderance in the performance of a morphing structure. There is therefore a need for developing a morphing structure that is capable of utilizing both rigid and flexible panels without facing the problem of flexible panels being folded while shape shifting.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to an omni-directional shape-morphing panel mechanism. An exemplary shape-morphing panel mechanism may include a central panel and a side panel, where a first edge of an exemplary side panel may be pivotally coupled to a first edge of an exemplary central panel. An exemplary morphing panel mechanism may further include a guide panel that may be coupled with a first corner of an exemplary central panel via a ball joint, where an exemplary guide panel may include a first slit. An exemplary morphing panel mechanism may further include a flexible panel, where a first edge of an exemplary flexible panel may be pivotally coupled with a second edge of an exemplary side panel, and a second edge of an exemplary flexible panel may be slidably disposed within an exemplary slit of an exemplary guide panel.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of an exemplary panel mechanism that may be made of a plurality of rigid panels coupled with a plurality of flexible panels. An exemplary panel mechanism may provide a load bearing surface that may be capable of changing shape. An exemplary panel mechanism may include a central panel to which one or more rigid side panels may pivotally be coupled. Exemplary side panels may be pivotally coupled with edges of an exemplary side panel and may pivot about pivot axes parallel with respective edges of an exemplary side panel. One or more guide panels may further be coupled to corners of an exemplary central panel, where each guide panel of exemplary guide panels may be a cylindrical sector rotatably coupled to a respective corner of an exemplary central panel utilizing a ball joint. An exemplary guide panel of one or more guide panels may include an open slit. One or more flexible panels may further be coupled between each side panel and an adjacent guide panel to further complete an exemplary load bearing surface provide by an exemplary panel mechanism. Exemplary flexible panels may be attached to an adjacent side panel via a plurality of single-axis hinges that may allow each flexible panel of one or more flexible panels to be pivotable relative to an adjacent side panel. Each exemplary flexible panel may be pivotally coupled to an adjacent side panel from a first edge and each flexible panel may further be slidable into an exemplary slit of an exemplary adjacent guide panel from a second opposing edge of each flexible side panel.

In an exemplary embodiment, such combination of one or more side panels, one or more guide panels, and one or more flexible panels that may be mounted between adjacent side panels and guide panels may make an exemplary panel mechanism to be a shape-morphing panel that may function as a load bearing surface capable of changing shape. Such shape-morphing capabilities of an exemplary panel mechanism may make an exemplary panel mechanism suitable for aerodynamic load bearing applications. For example, an exemplary panel mechanism may be utilized as a wind guiding and capturing surface in a wind harnessing system.

Figure 1:
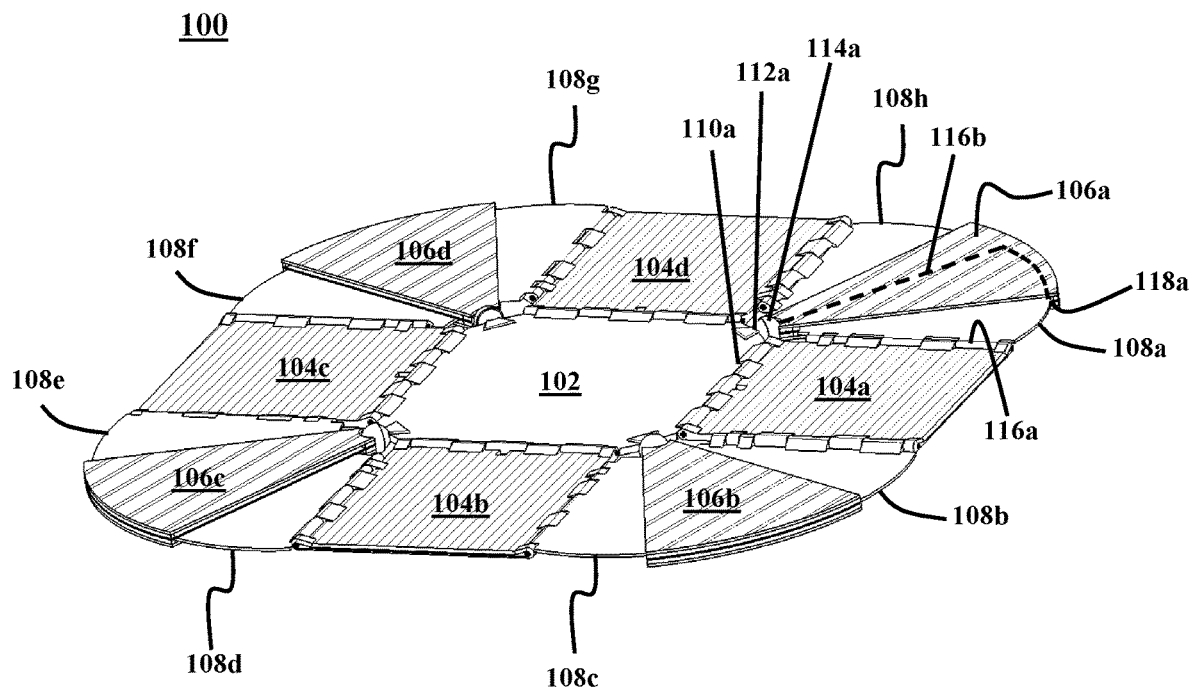
FIG. 1 illustrates a perspective view of a panel mechanism, consistent with one or more exemplary embodiments of the present disclosure.

FIG. 1 illustrates a perspective view of a panel mechanism 100, consistent with one or more exemplary embodiments of the present disclosure. In an exemplary embodiment, panel mechanism 100 may include a central panel 102, one or more side panels (104a-104d) that may be pivotally coupled with edges of central panel 102, one or more guide panels (106a-106d) that may be coupled with corners of central panel 102, and one or more flexible panels (108a-108h). For example, panel mechanism 100 may include a first side panel 104a that may be pivotally coupled with a first edge 110a of central panel 102 and a first guide panel 106a shaped as a hollow cylindrical sector that may be coupled with a first corner 112a of central panel 102 via a first ball joint 114a. In addition, panel mechanism 100 may include a first flexible panel 108a shaped as a flexible cylindrical sector that may be mounted between first side panel 104a and first guide panel 106a such that a first edge 116a of first flexible panel 108a may be pivotally coupled with first side panel 104a, while an opposite second edge 116b of first flexible panel 108a may be slidably disposed within a first slit 118a of first guide panel 106a, as will be discussed in the following paragraphs. In an exemplary embodiment, one or more guide panels (106a-106d) may be of the same shape and size. In an exemplary embodiment, one or more flexible panels (108a-108h) may be of the same shape and size.

Figure 2A:
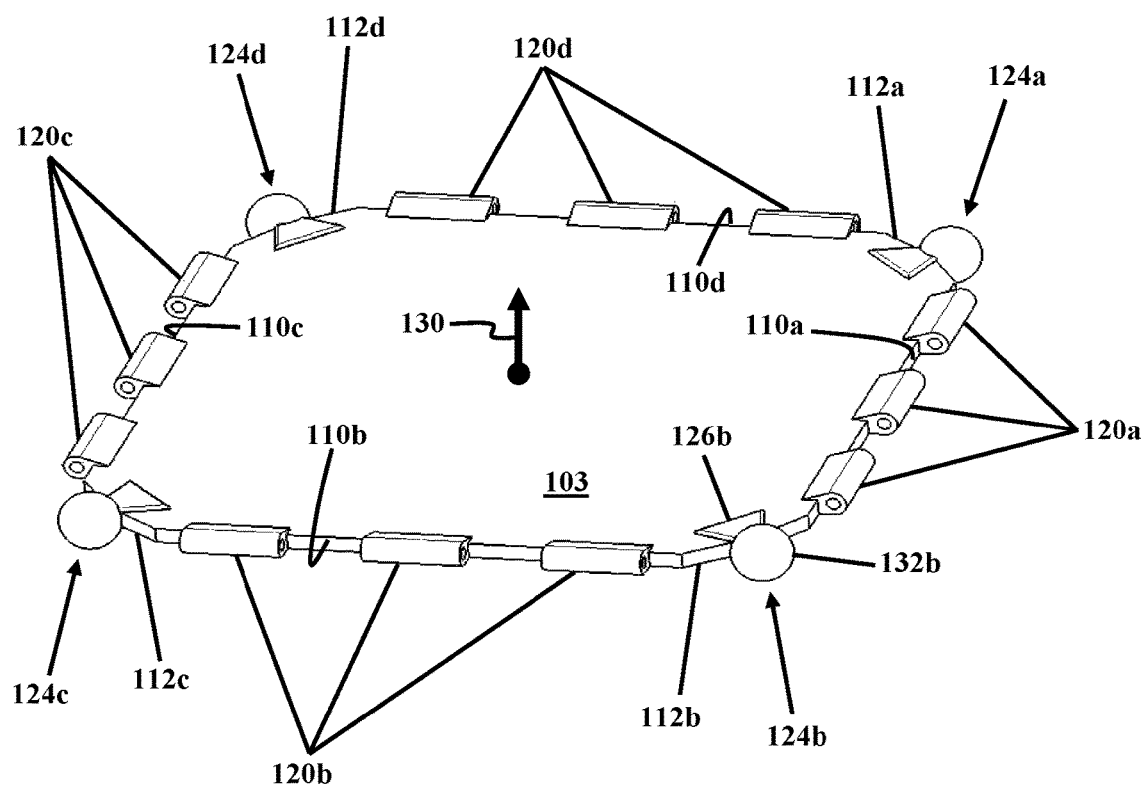
FIG. 2A illustrates a perspective view of a central panel, consistent with one or more exemplary embodiments of the present disclosure.
Figure 2B:
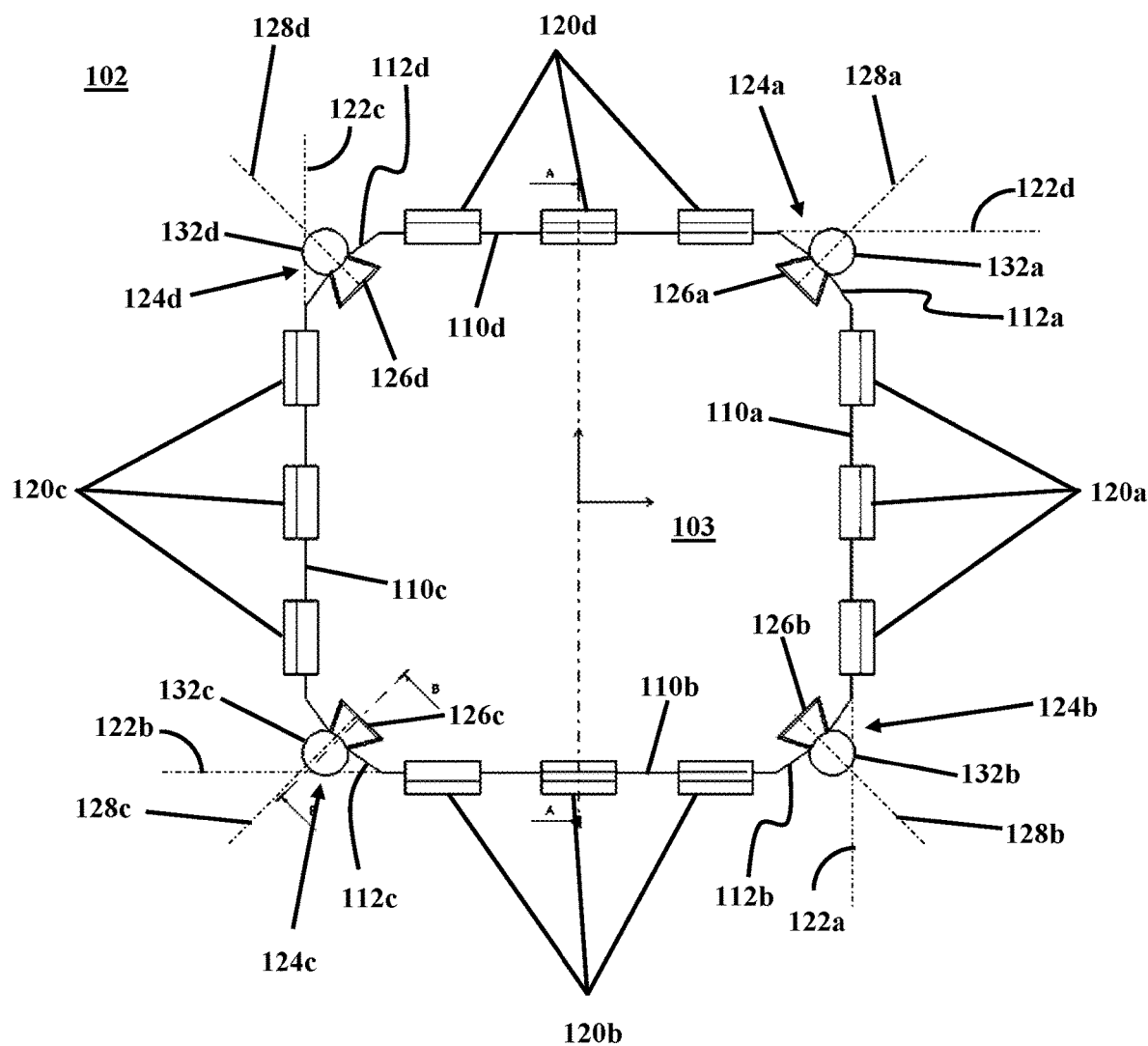
FIG. 2B illustrates a top view of a central panel, consistent with one or more exemplary embodiments of the present disclosure.
Figure 2C:
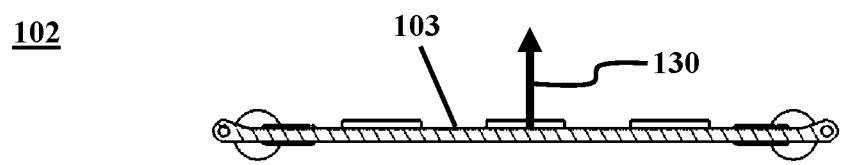
FIG. 2C illustrates a side view of a central panel, consistent with one or more exemplary embodiments of the present disclosure.

FIG. 2A illustrates a perspective view of central panel 102, consistent with one or more exemplary embodiments of the present disclosure. FIG. 2B illustrates a top view of central panel 102, consistent with one or more exemplary embodiments of the present disclosure. FIG. 2C illustrates a side view of central panel 102, consistent with one or more exemplary embodiments of the present disclosure.

In an exemplary embodiment, central panel 102 may include a flat panel 103 with four edges (110a-110d) that may extend between four respective corners (112a-112d). For example, first edge 110a may extend between first corner 112a and second corner 112b, second edge 110b may extend between second corner 112b and third corner 112c, third edge 110c may extend between third corner 112c and fourth corner 112d, and fourth edge 110d may extend between fourth corner 112d and first corner 112a. In an exemplary embodiment, central panel 102 may further include a first plurality of hinge knuckles 120a attached to first edge 110a, a second plurality of hinge knuckles 120b attached to second edge 110b, a third plurality of hinge knuckles 120c attached to third edge 110c, and a fourth plurality of hinge knuckles 120d attached to fourth edge 110d. In an exemplary embodiment, each of first plurality of hinge knuckles 120a, second plurality of hinge knuckles 120b, third plurality of hinge knuckles 120c, and fourth plurality of hinge knuckles 120d may be arranged along respective longitudinal axes (122a-122d) of first edge 110a, second edge 110b, third edge 110c, and fourth edge 110d of central panel 102.

In an exemplary embodiment, central panel 102 may further include a first ball stud 124a attached to first corner 112a, a second ball stud 124b attached to second corner 112b, a third ball stud 124c attached to third corner 112c, and a fourth ball stud 124d attached to fourth corner 112d. In an exemplary embodiment, each of first ball stud 124a, second ball stud 124b, third ball stud 124c, and fourth ball stud 124d may include a stud extended along a longitudinal axis perpendicular to a normal axis 130 of central panel 102, and a ball attached to a distal end of stud. For example, first ball stud 124a may include a first stud 126a extended along a longitudinal axis 128a perpendicular to normal axis 130 of central panel 102 and a first ball 132a attached to a distal end of first stud 126a. In an exemplary embodiment, second ball stud 124b may include a second stud 126b extended along a longitudinal axis 128b perpendicular to normal axis 130 of central panel 102 and a second ball 132b attached to a distal end of second stud 126b. In an exemplary embodiment, third ball stud 124c may include a third stud 126c extended along a longitudinal axis 128c perpendicular to normal axis 130 of central panel 102 and a third ball 132c attached to a distal end of third stud 126c. In an exemplary embodiment, fourth ball stud 124d may include a fourth stud 126d extended along a longitudinal axis 128d perpendicular to normal axis 130 of central panel 102 and a fourth ball 132d attached to a distal end of fourth stud 126d. As used herein, distal end may refer to an end of stud opposite the end of stud that may be attached to central panel 102. As used herein, a normal axis of an object may refer to an axis perpendicular to the largest surface of that object. As used herein, a longitudinal axis of an object may refer to an axis associated with the longest dimension of that object.

In an exemplary embodiment, flat plate 103 of central panel 102 may be made of rigid materials that may not be bent or deformed in any direction. In an exemplary embodiment, first edge 110a and third edge 110c may be parallel with each other, and second edge 110b and fourth edge 110d may be parallel with each other. In an exemplary embodiment, first edge 110a, fourth edge 110d, and normal axis 130 may be mutually perpendicular, and second edge 110b, third edge 110c, and normal axis 130 may be mutually perpendicular.

Figure 3A:
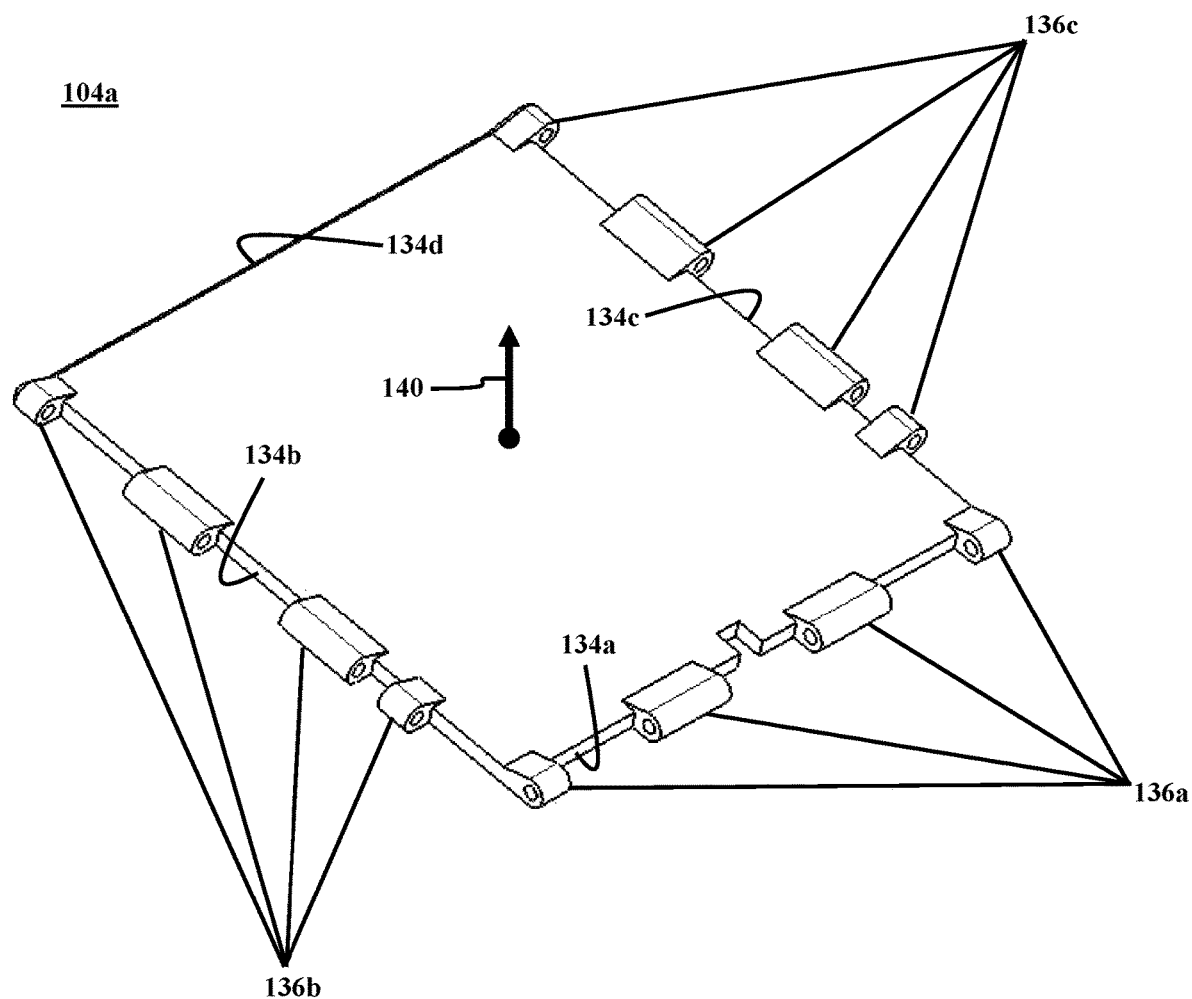
FIG. 3A illustrates a perspective view of a first side panel, consistent with one or more exemplary embodiments of the present disclosure.
Figure 3B:
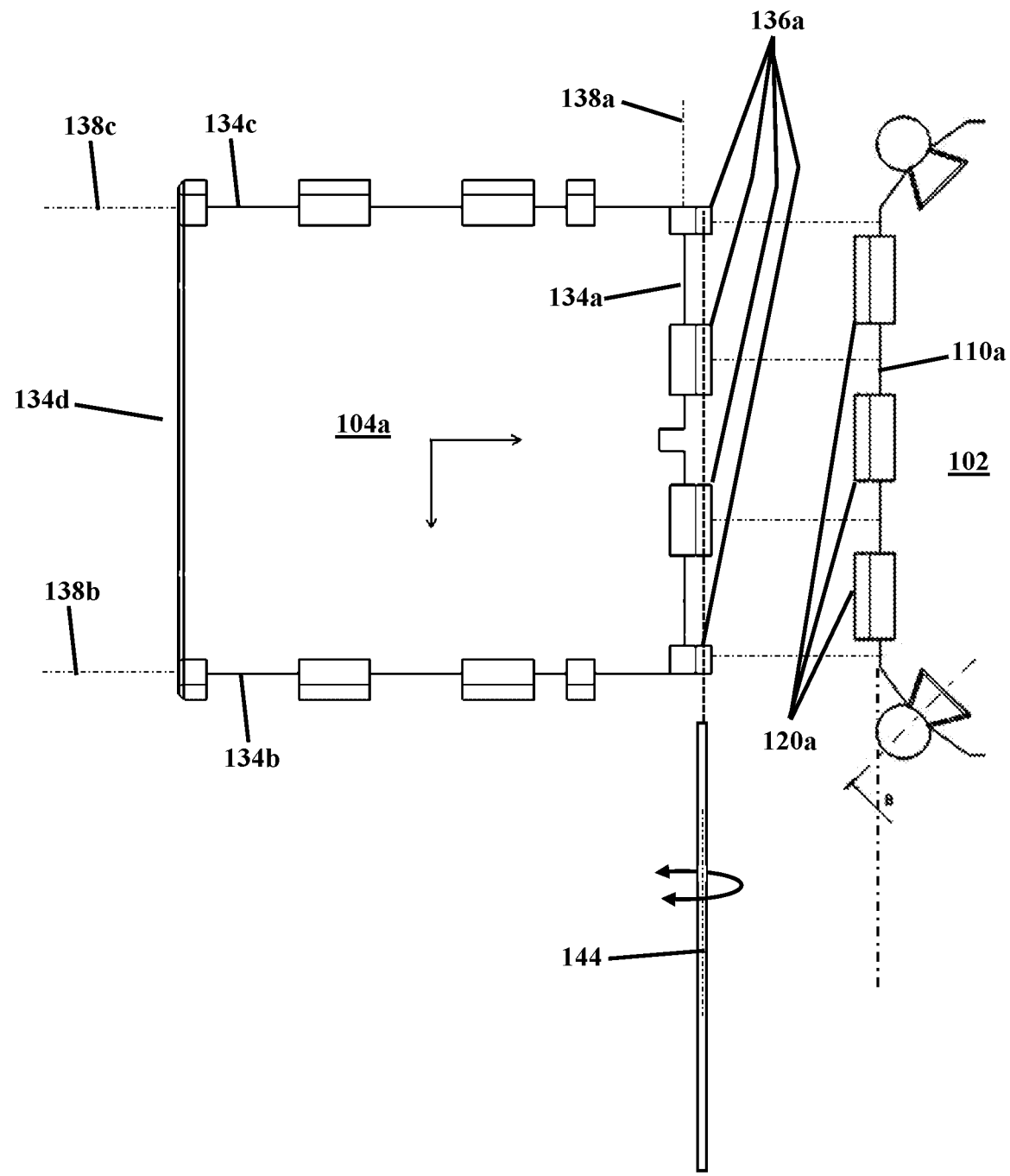
FIG. 3B illustrates a top view of a first side panel pivotally coupled to a central panel, consistent with one or more exemplary embodiments of the present disclosure.
Figure 3C:
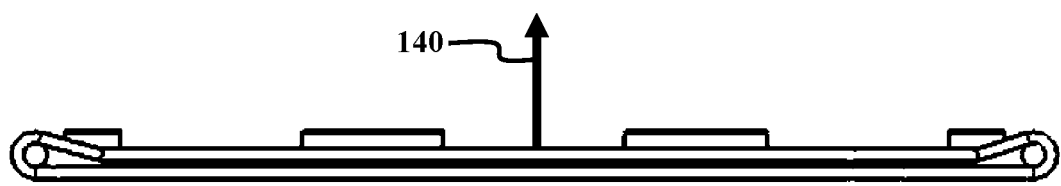
FIG. 3C illustrates a side view of a first side panel, consistent with one or more exemplary embodiments of the present disclosure.

FIG. 3A illustrates a perspective view of first side panel 104a, consistent with one or more exemplary embodiments of the present disclosure. FIG. 3B illustrates a top view of first side panel 104a pivotally coupled to central panel 102, consistent with one or more exemplary embodiments of the present disclosure. FIG. 3C illustrates a side view of first side panel 104a, consistent with one or more exemplary embodiments of the present disclosure.

In an exemplary embodiment, each side panel of one or more side panels (104a-104d), for example first side panel 104a may be a flat panel with four edges (134a-134d). In an exemplary embodiment, each side panel of one or more side panels (104a-104d), for example, first side panel 104a may further include a first plurality of hinge knuckles 136a attached to first edge 134a, a second plurality of hinge knuckles 136b attached to second edge 134b, and a third plurality of hinge knuckles 136c attached to third edge 134c. In an exemplary embodiment, fourth edge 134d, which may be a distal edge of first side panel 104a positioned away from central panel 102 may be a free edge without any hinge knuckles 120d attached to fourth edge 134d. In an exemplary embodiment, each of first plurality of hinge knuckles 136a, second plurality of hinge knuckles 136b, and third plurality of hinge knuckles 136c may be arranged along respective longitudinal axes (138a-138c) of first edge 134a, second edge 134b, and third edge 134c of first side panel 104a.

In an exemplary embodiment, each side panel of one or more side panels (104a-104d) may be a flat plate made of a rigid material that may not be deformed or bent in any direction. In an exemplary embodiment, opposite edges of each side panel of one or more side panels (104a-104d) may be parallel with each other, while adjacent edges of each side panel of one or more side panels (104a-104d) may be orthogonal. For example, first edge 134a and fourth edge 134d may be parallel with each other, while second edge 134b and third edge 134c may be parallel with each other. In an exemplary embodiment, first edge 134a, second edge 134b and a normal axis 140 of first side panel 104a may be mutually perpendicular. In an exemplary embodiment, second side panel 104b, third side panel 104c, and fourth side panel 104d of one or more side panels (104a-104d) may all be structurally similar to first side panel 104a.

In an exemplary embodiment, each side panel of one or more side panels (104a-104d) may be pivotally attached to a respective edge of central panel 102. For example, first edge 134a of first side panel 104a may be pivotally attached to first edge 110a of central panel 102. To this end, in an exemplary embodiment, first plurality of hinge knuckles 136a may be positioned between respective hinge knuckles of first plurality of hinge knuckles 120a and a first hinge pin 142 may be passed through aligned holes of first plurality of hinge knuckles 136a and first plurality of hinge knuckles 120a. In an exemplary embodiment, such arrangement of first plurality of hinge knuckles 136a and first plurality of hinge knuckles 120a and first hinge pin 142 may form a plurality of single-axis hinges that may allow for first side panel 104a to pivot about a pivot axis 144 parallel with longitudinal axis 122a with respect to central panel 102.

Figure 4A:
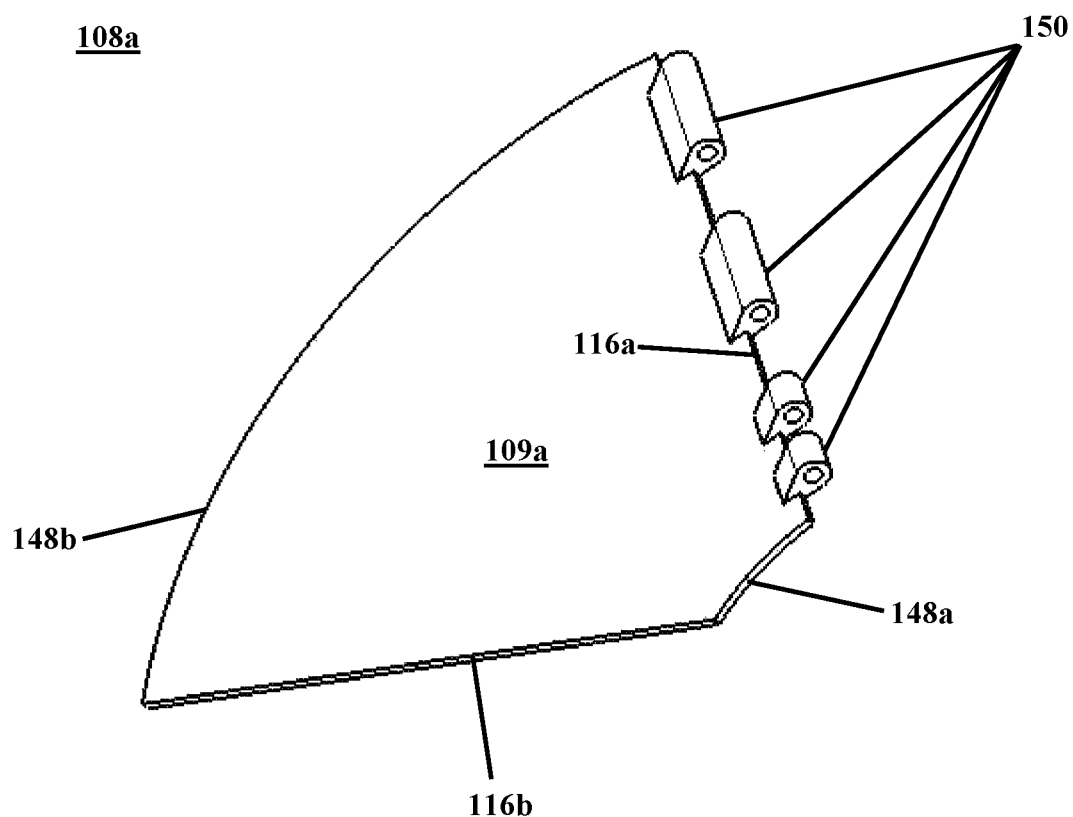
FIG. 4A illustrates a perspective view of a first flexible panel, consistent with one or more exemplary embodiments of the present disclosure.
Figure 4B:
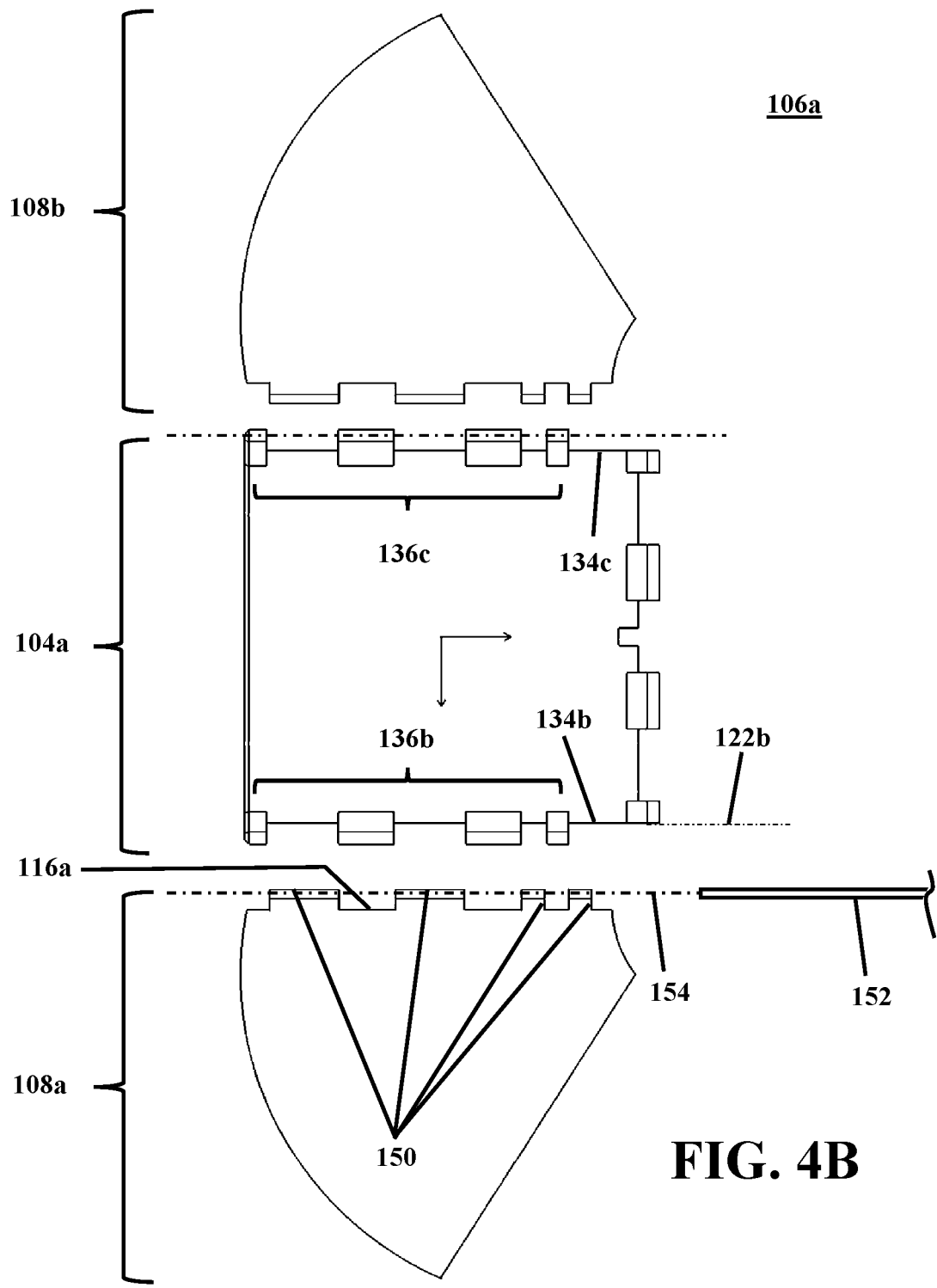
FIG. 4B illustrates a top view of a first flexible panel and a second flexible panel pivotally attached to opposite edges of a first side panel, consistent with one or more exemplary embodiments of the present disclosure.
Figure 4C:
FIG. 4C illustrates a side view of a first flexible panel, consistent with one or more exemplary embodiments of the present disclosure.

FIG. 4A illustrates a perspective view of first flexible panel 108a, consistent with one or more exemplary embodiments of the present disclosure. FIG. 4B illustrates a top view of first flexible panel 108a and a second flexible panel 108b pivotally attached to opposite edges of first side panel 104a, consistent with one or more exemplary embodiments of the present disclosure. FIG. 4C illustrates a side view of first flexible panel 108a, consistent with one or more exemplary embodiments of the present disclosure.

In an exemplary embodiment, each flexible panel of one or more flexible panels (108a-108h), for example, first flexible panel 108a may include an elastic cylindrical sector 109a with a first straight edge 116a and a second straight edge 116b that may extend between a proximal curved edge 148a and a distal curved edge 148b. As used herein, proximal may refer to a position close to central panel 102 and distal may refer to a position away from central panel 102. In an exemplary embodiment, elastic cylindrical sector 109a of first flexible panel 108a may be deformable and bendable in all direction in response to an external force exerted on elastic cylindrical sector 109a. In an exemplary embodiment, elastic cylindrical sector 109a may be made of an elastic material such as flexible polylactic acid (PLA).

In an exemplary embodiment, each flexible panel of one or more flexible panels (108a-108h), for example, first flexible panel 108a may further include a plurality of hinge knuckles 150 attached to first straight edge 116a. In an exemplary embodiment, each flexible panel of one or more flexible panels (108a-108h) may be pivotally attached to a respective edge of an adjacent side panel of one or more side panels (104a-104d). For example, first straight edge 116a of first flexible panel 108a may be pivotally attached to second edge 134*b* of first side panel 104*a*. To this end, in an exemplary embodiment, plurality of hinge knuckles 150 may be positioned between respective hinge knuckles of second plurality of hinge knuckles 136*b* and a second hinge pin 152 may be passed through aligned holes of plurality of hinge knuckles 150 and first plurality of hinge knuckles 136*a*. In an exemplary embodiment, such arrangement of plurality of hinge knuckles 150, second plurality of hinge knuckles 136*b*, and second hinge pin 152 may form a single-axis hinge that may allow for first flexible panel 108*a* to pivot about a pivot axis 154 parallel with longitudinal axis 122*b* with respect to first side panel 104*a*. In an exemplary embodiment, second flexible panel 180*b* may similarly be pivotally coupled to third edge 134*c* of first side panel 104*a*. In a similar manner, two flexible panels may be pivotally attached to either side edges of respective side panels of one or more side panels (104*a*-104*d*).

Figure 5A:
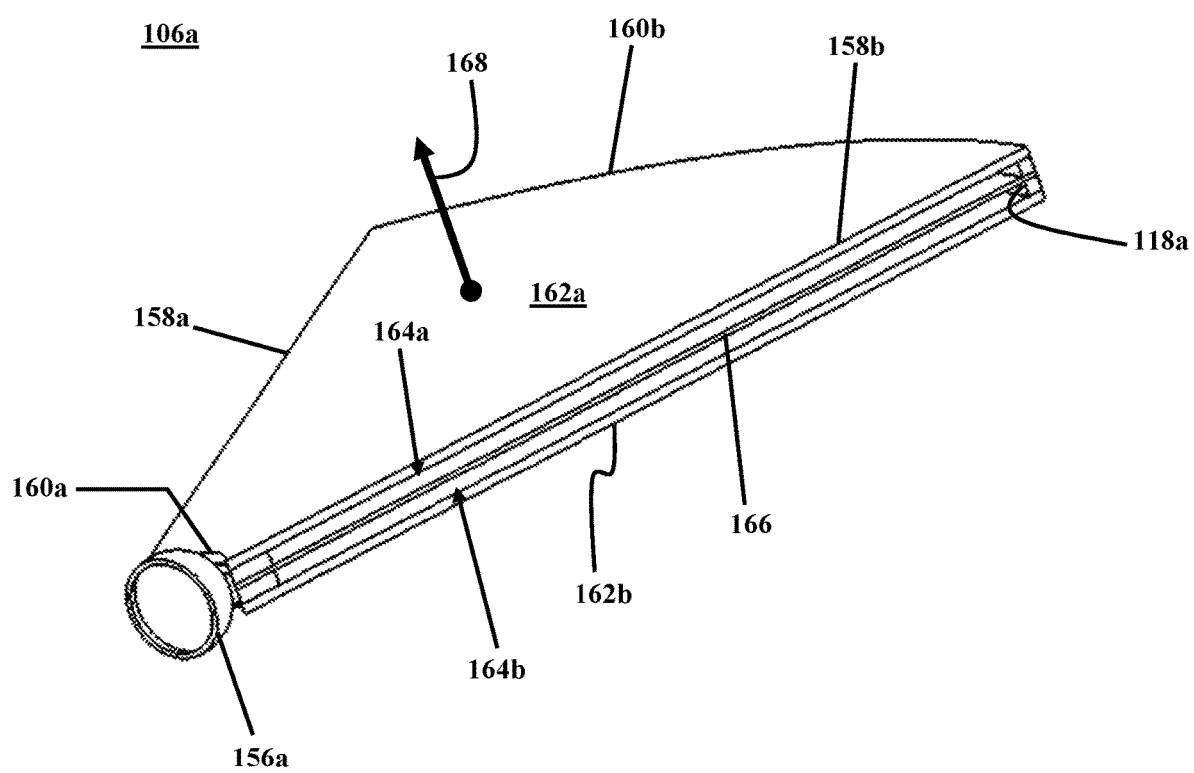
FIG. 5A illustrates a perspective view of a first guide panel, consistent with one or more exemplary embodiments of the present disclosure.
Figure 5B:
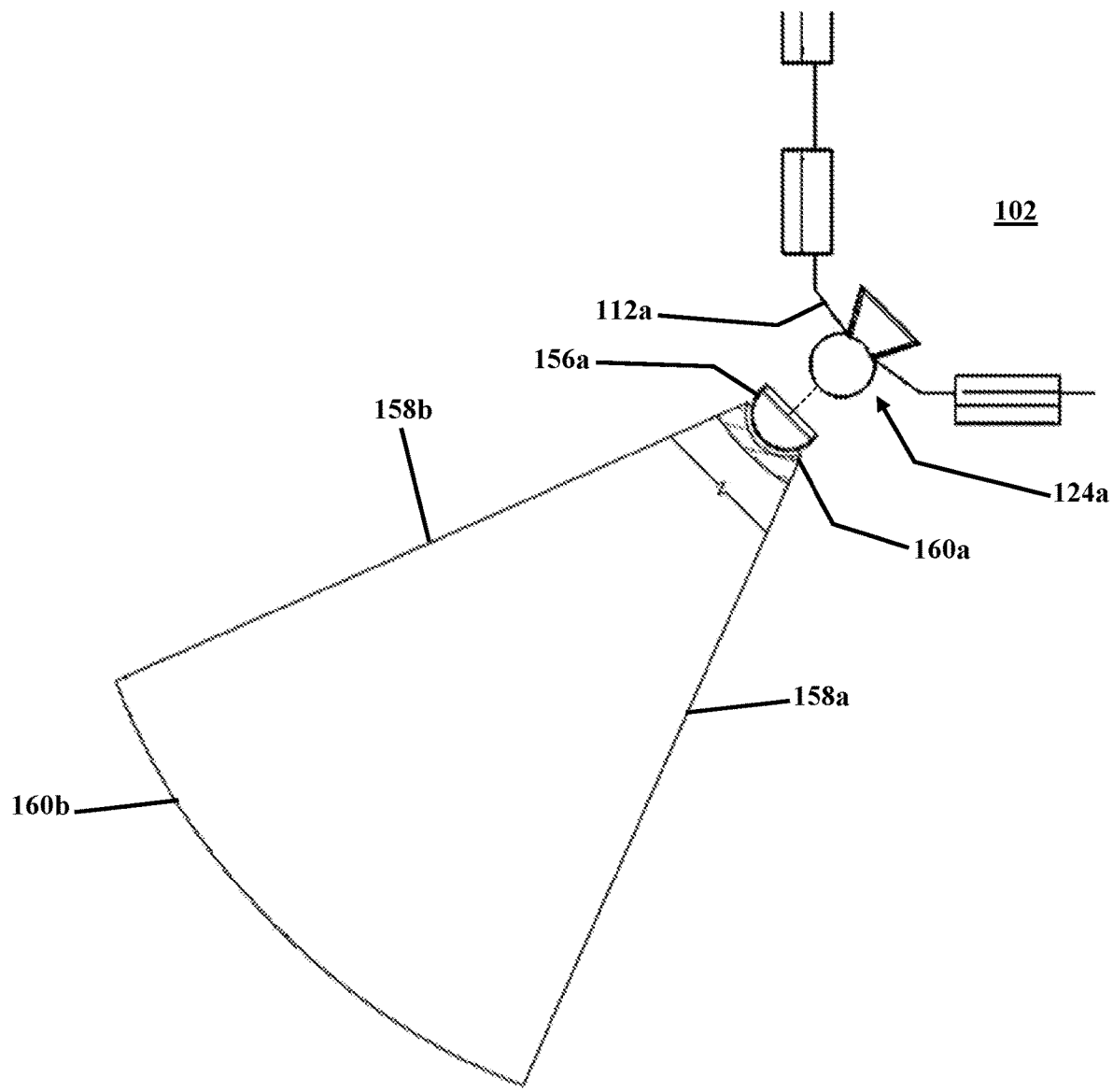
FIG. 5B illustrates an exploded top view of a first guide panel coupled with a central panel, consistent with one or more exemplary embodiments of the present disclosure.
Figure 5C:
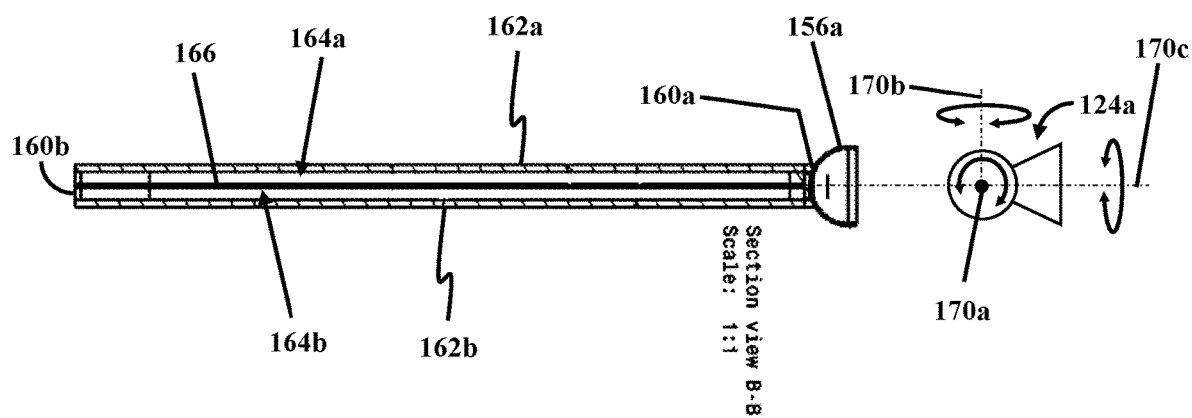
FIG. 5C illustrates a side view of a first guide panel, consistent with one or more exemplary embodiments of the present disclosure.

FIG. 5A illustrates a perspective view of first guide panel 106*a*, consistent with one or more exemplary embodiments of the present disclosure. FIG. 5B illustrates an exploded top view of first guide panel 106*a* coupled with central panel 102, consistent with one or more exemplary embodiments of the present disclosure. FIG. 5C illustrates a side view of first guide panel 106*a*, consistent with one or more exemplary embodiments of the present disclosure.

In an exemplary embodiment, each guide panel of one or more guide panels (106*a*-106*d*), for example first guide panel 106*a* may include a cylindrical sector with a first straight edge 158*a* and a second straight edge 158*b*, both extended between a proximal curved edge 160*a* and a distal curved edge 160*b*. In an exemplary embodiment, first guide panel 106*a* may further include a flat top surface 162*a* and a flat bottom surface 162*b*. In an exemplary embodiment, flat top surface 162*a*, flat bottom surface 162*b*, proximal curved edge 160*a*, and distal curved edge 160*b* may enclose a hollow space within first guide panel 106*a* that may be referred to herein as a first slit 118*a*. In an exemplary embodiment, first slit 118*a* may further be divided by a flat divider panel 166 into an upper slit 164*a* and a lower slit 164*b*. In an exemplary embodiment, upper slit 164*a* may be positioned above lower slit 164*b* along a normal axis 168 of flat top surface 162*a*. As used herein, normal axis 168 of flat top surface 162*a* is an axis perpendicular to flat top surface 162*a*. In an exemplary embodiment, flat divider panel 166 may be parallel with flat top surface 162*a* and flat bottom surface 162*b*. In an exemplary embodiment, upper slit 164*a* and lower slit 164*b* may be of the same size and shape. In an exemplary embodiment, first guide panel 106*a* may further include first socket 156*a* that may be attached to proximal curved edge 160*a*. In an exemplary embodiment, first socket 156*a* may include a cylinder hemisphere that may be configured to receive a corresponding first ball stud 124*a* of central panel 102. As used herein, first ball stud 124*a* of central panel 102 being received within first socket 156*a* may refer to first ball stud 124*a* and first socket 156*a* being rotatably coupled, thereby, forming first ball joint 114*a*. In an exemplary embodiment, first ball joint 114*a* may provide first guide panel 106*a* with three degrees of freedom (DOFs), including pitch, yaw, and roll degrees of freedom. In other words, such configuration of first ball joint 114*a* and how first guide panel 106*a* may be coupled with a first corner 112*a* of central panel 102 utilizing first ball joint 114*a*, may allow for first guide panel 106*a* to be capable of assuming a pitch rotational movement about axis 170*a*, a yaw rotational movement about axis 170*b*, and a roll rotational movement about axis 170*c* relative to central panel 102.

Figure 6:
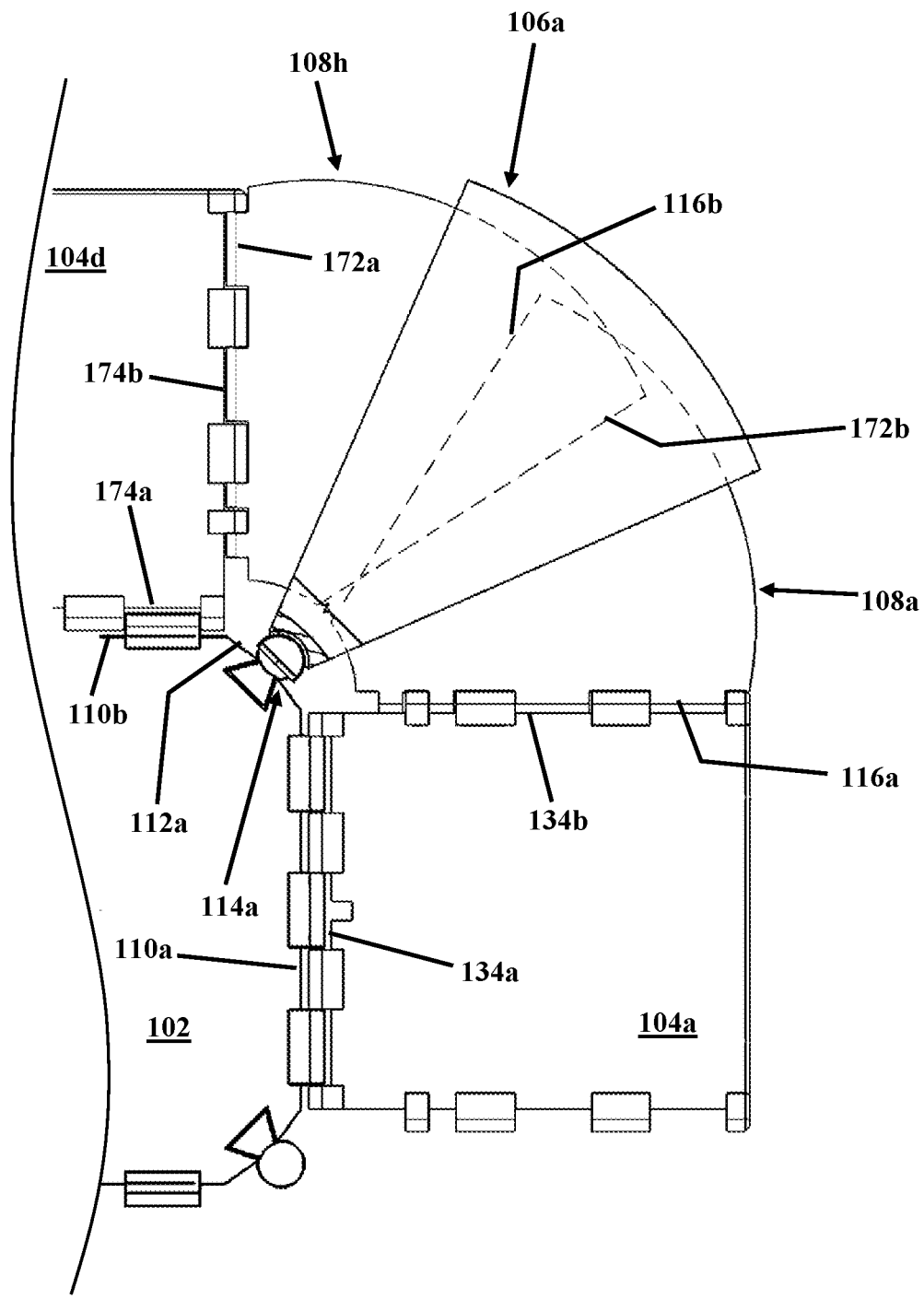
FIG. 6 illustrates a sectional top view of a first flexible panel, an eighth flexible panel, a first side panel, a fourth side panel, and a first guide panel, consistent with one or more exemplary embodiments of the present disclosure.

FIG. 6 illustrates a sectional top view of first flexible panel 108*a*, eighth flexible panel 108*h*, first side panel 104*a*, fourth side panel 104*d*, and first guide panel 106*a*, consistent with one or more exemplary embodiments of the present disclosure. As mentioned before, in an exemplary embodiment, between each side panel and its adjacent guide panel, a flexible panel may be mounted. For example, first flexible panel 108*a* may be mounted between first side panel 104*a* and first guide panel 106*a*. Similarly, eighth flexible panel 108*h* may be mounted between fourth side panel 104*d* and first guide panel 106*a*. In an exemplary embodiment, a first edge of each flexible panel may be pivotally coupled with an adjacent side panel, while each flexible panel may be slidable into a respective slit of an adjacent guide panel from a second opposing edge of each flexible panel. For example, a first edge 116*a* of first flexible panel 108*a* may be pivotally coupled with first side panel 104*a*, while first flexible panel 108*a* may be slidable into either upper slit 164*a* or lower slit 164*b* of first guide panel 106*a* from an opposite second edge 116*b* of first flexible panel 108*a*. Similarly, a first edge 172*a* of eighth flexible panel 108*h* may be pivotally coupled with fourth side panel 104*d*, while eighth flexible panel 108*h* may be slidable into either upper slit 164*a* or lower slit 164*b* of first guide panel 106*a* from an opposite second edge 172*b* of eighth flexible panel 108*h*. In an exemplary embodiment, first flexible panel 108*a* may be slidable into upper slit 164*a* and eighth flexible panel may be slidable into lower slit 164*b* or vice versa. In an exemplary embodiment, each flexible panel may be slidably moveable in and out of a respective slit of an adjacent guide panel on a plane parallel with a flat top surface of that guide panel. In an exemplary embodiment, such sliding movement of each of flexible panels into and out of respective slit of a respective adjacent guide panel may prevent each flexible panel to be folded as side panels pivot relative to central panel 102. For example, when first side panel 104*a* pivots relative to central panel 102, first side panel 104*a* pulls first flexible panel 108*a* upward or downward from first edge 116*a* of first flexible panel 108*a*. In response to such movement, first flexible panel 108*a* may slide in or out of a respective one of upper slit 164*a* or lower slit 164*b* without being folded. In addition, each guide panel may also assume a rotational movement relative to central panel 102 in response to each side panel pivoting relative to central panel 102. For example, when first side panel 104*a* pivots relative to central panel 102, first guide panel 106*a* may assume a rotational pitch, yaw, or roll movement relative to central panel 102 about first ball joint 114*a* attached to first corner 112*a* of central panel 102.

Figure 7:
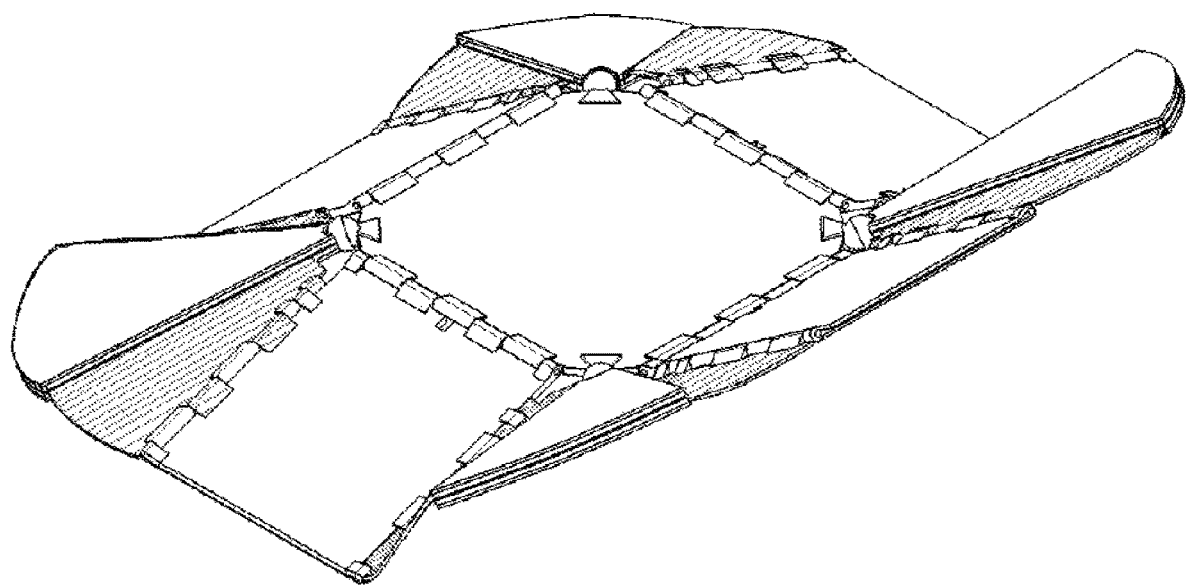
FIG. 7 illustrates a perspective view of a panel mechanism, consistent with one or more exemplary embodiments of the present disclosure.

FIG. 7 illustrates a perspective view of panel mechanism 100, consistent with one or more exemplary embodiments of the present disclosure. In an exemplary embodiment, panel mechanism 100 may change shape utilizing different DOFs provided by hinges and joints within panel mechanism 100, as was discussed in preceding paragraphs. Such omnidirectional morphing property may allow for utilizing panel mechanism 100 for various applications, such as aerodynamic load bearing applications. As mentioned in the preceding paragraphs, in an exemplary embodiment, sliding movements of one or more flexible panels (108*a*-108*h*) of panel mechanism 100 in and out of respective guide panels of one or more guide panels (106*a*-106*d*) may prevent one or more flexible panels (108*a*-108*h*) to be folded. In exemplary embodiments, such design of panel mechanism 100, where folding of one or more flexible panels (108*a*-108*h*) may be prevented by allowing them to freely slide in and out of respective slits of one or more guide panels (106*a*-106*d*) may in fact be beneficial in aerodynamic load bearing applications, where folded flexible panels may adversely affect aerodynamic properties of panel mechanism 100.

Figure 8:
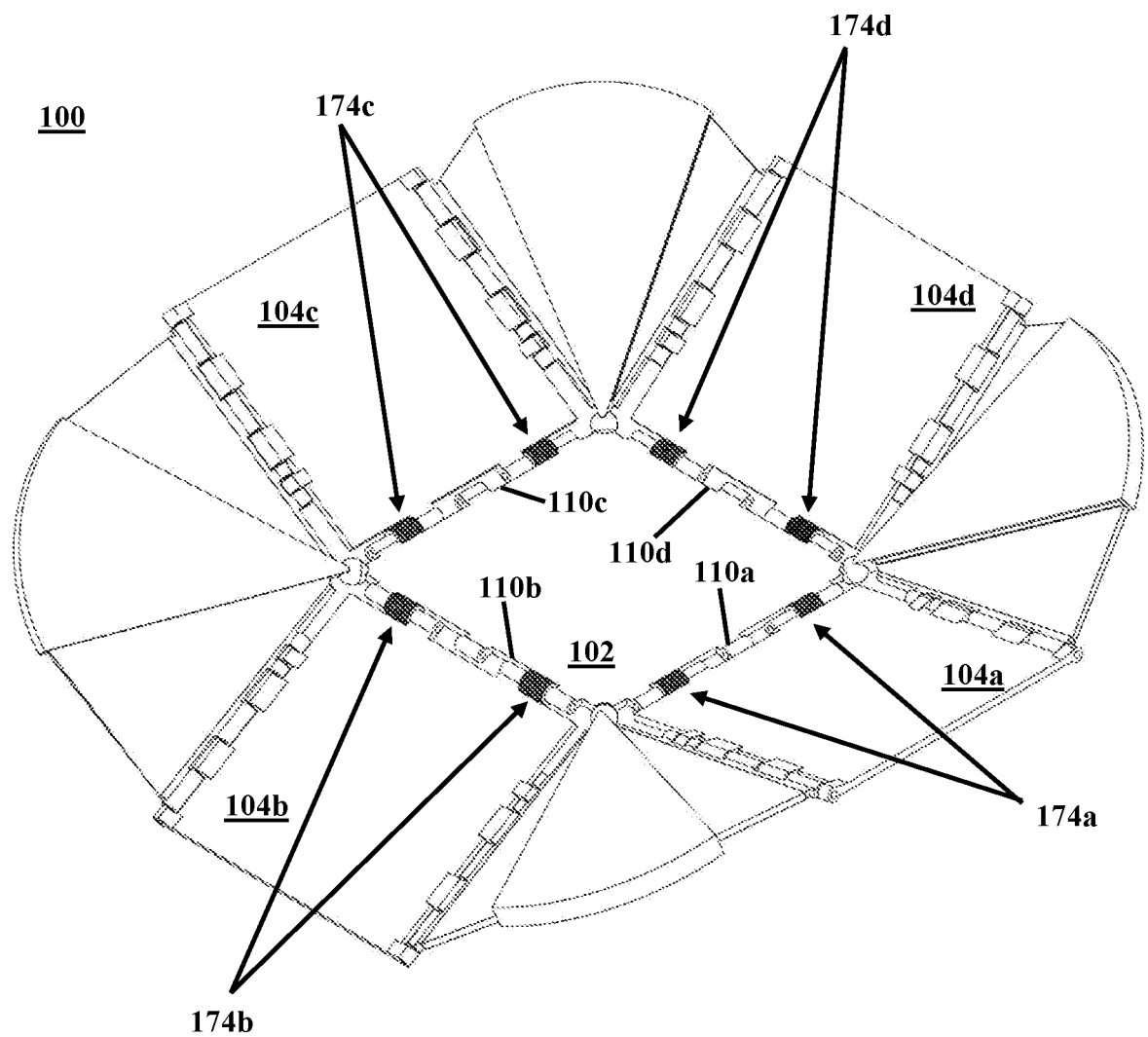
FIG. 8 illustrates rotary actuators of a panel mechanism, consistent with one or more exemplary embodiments of the present disclosure.

FIG. 8 illustrates rotary actuators (174a-174d) of panel mechanism 100, consistent with one or more exemplary embodiments of the present disclosure. In an exemplary embodiment, panel mechanism 100 may include a plurality of rotary actuators that may be coupled with hinge mechanisms of one or more side panels (104a-104d) of panel mechanism 100. For example, a first couple of rotary actuators 174a may be coupled with single-axis hinges between first side panel 104a and central panel 102. In an exemplary embodiment, first couple of rotary actuators 174a may be configured to actuate a pivotal movement of first side panel 104a about a pivot axis parallel with first edge 110a of central panel 102. Similarly, a second couple of rotary actuators 174b may be coupled with single-axis hinges between second side panel 104b and central panel 102, a third couple of rotary actuators 174c may be coupled with single-axis hinges between third side panel 104c and central panel 102, and a fourth couple of rotary actuators 174d may be coupled with single-axis hinges between fourth side panel 104d and central panel 102.

In an exemplary embodiment, second couple of rotary actuators 174b may be configured to actuate a pivotal movement of second side panel 104b about a pivot axis parallel with second edge 110b of central panel 102. In an exemplary embodiment, third couple of rotary actuators 174c may be configured to actuate a pivotal movement of third side panel 104c about a pivot axis parallel with third edge 110c of central panel 102. In an exemplary embodiment, fourth couple of rotary actuators 174d may be configured to actuate a pivotal movement of fourth side panel 104d about a pivot axis parallel with fourth edge 110d of central panel 102.

In an exemplary embodiment, such arrangement of rotary actuators (174a-174d) may allow for pivotally moving each respective side panel of one or more side panels (104a-104d) independently, which in turn may allow for changing the shape of panel mechanism 100 to a desired shape. In an exemplary embodiment, each rotary actuator of rotary actuators (174a-174d) may be a servomotor or a stepper motor that may be configured to drive a rotational movement of a respective side panel of one or more side panels (104a-104d) relative to central panel 102.

Figure 9:
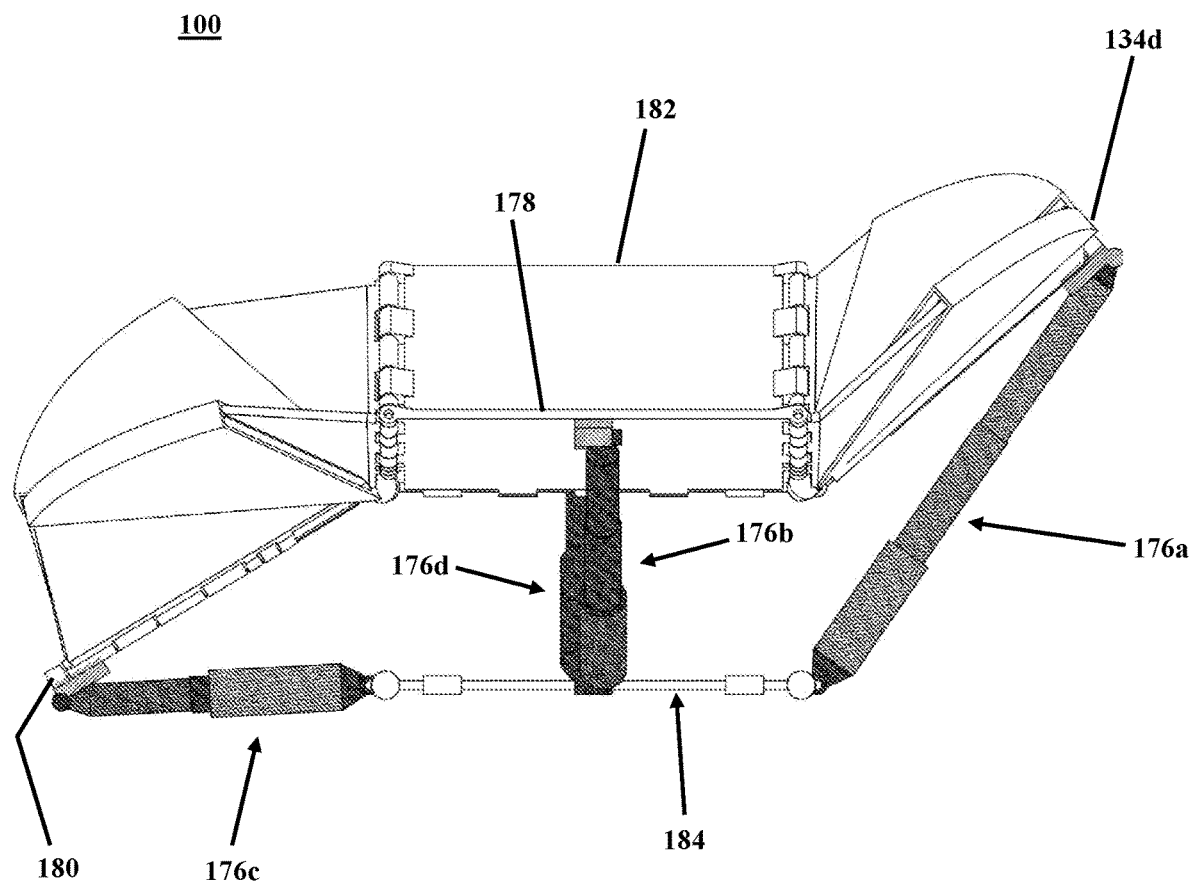
FIG. 9 illustrates linear actuators of a panel mechanism, consistent with one or more exemplary embodiments of the present disclosure.

FIG. 9 illustrates linear actuators (176a-176d) of panel mechanism 100, consistent with one or more exemplary embodiments of the present disclosure. In an exemplary embodiment, panel mechanism 100 may include a plurality of linear actuators that may be coupled with edges of one or more side panels (104a-104d) of panel mechanism 100. For example, a first linear actuator 176a may be coupled between a fixed base 184 beneath central panel 102 and fourth edge 134d of first side panel 104a, a second linear actuator 176b may be coupled between fixed base 184 and fourth edge 178 of second side panel 104b, a third linear actuator 176c may be coupled between fixed base 184 and fourth edge 180 of third side panel 104c, and a fourth linear actuator 176d may be coupled between fixed base 184 and fourth edge 182 of fourth side panel 104d. In an exemplary embodiment, linear actuators (176a-176d) may include telescopic pneumatic or hydraulic actuators that may be configured to urge pivotal movement of one or more side panels (104a-104d) relative to central panel 102. In an exemplary embodiment, other similar types of actuators, such as ball screws or belt-and-pulley mechanisms may as well be utilized for driving pivotal movements of one or more side panels (104a-104d) relative to central panel 102.

In an exemplary embodiment, such configuration of actuators may allow panel mechanism 100 to be utilized as an aerodynamic controllable roof structure for capturing incident wind and guiding the captured incident wind into a wind harnessing and delivery system. In other words, panel mechanism 100 may be an aerodynamic load bearing surface that may be capable of shape morphing due to arrangement of central panel 102 and how one or more side panels (104a-104d) may pivot relative to central panel 102. In an exemplary embodiment, the arrangement of one or more guide panels (106a-106d) and how one or more flexible panels (108a-108h) may slide into and out of respective slits of respective guide panels of one or more guide panels (106a-106d) may prevent one or more flexible panels (108a-108h) to be folded. This way, aerodynamic load may be well distributed over an entire surface of panel mechanism 100.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A morphing omni-directional panel mechanism, comprising:
    a central panel;
    a side panel, a first edge of the side panel pivotally coupled to a first edge of the central panel;
    a guide panel coupled with a first corner of the central panel via a ball joint, the guide panel comprising a first slit; and a flexible panel, a first edge of the flexible panel pivotally coupled with a second edge of the side panel, a second edge of the flexible panel slidably disposed within the slit of the guide panel, wherein the flexible panel comprises an elastic material, the elastic material deformable in response to the side panel pivoting with respect to the central panel.

2. A morphing omni-directional panel mechanism, comprising:

a central panel;

a side panel, a first edge of the side panel pivotally coupled to a first edge of the central panel;

a guide panel coupled with a first corner of the central panel via a ball joint, the guide panel comprising a first slit; and a flexible panel, a first edge of the flexible panel pivotally coupled with a second edge of the side panel, a second edge of the flexible panel slidably disposed within the slit of the guide panel.

3. The mechanism of claim 2, wherein the first edge of the central panel is extended between the first corner of the central panel and a second corner of the central panel along a longitudinal axis of the first edge of the central panel.

4. The mechanism of claim 3, wherein the side panel is pivotable about a pivot axis parallel with the longitudinal axis of the first edge of the central panel.

5. The mechanism of claim 4, wherein the central panel comprises a flat plate with the longitudinal axis of the first edge of the central panel perpendicular to a normal axis of the flat plate.

6. The mechanism of claim 4, wherein the second edge of the side panel is perpendicular to the first edge of the side panel, the first edge of the flexible panel pivotable about a pivot axis parallel with a longitudinal axis of the second edge of the side panel.

7. The mechanism of claim 6, wherein the guide panel comprises a cylindrical sector with two straight side edges extended between a proximal curved edge and a distal curved edge, the cylindrical sector further comprising a flat top surface and a flat bottom surface, the slit enclosed by the proximal curved edge and distal curved edge, the top flat surface, and the bottom flat surface.

8. The mechanism of claim 7, wherein the flexible panel is slidably disposed within the slit of the guide panel from the second edge of the flexible panel, the flexible panel slidably moveable in and out of the slit on a plane parallel with the flat top surface of the guide panel.

9. The mechanism of claim 8, wherein the flexible panel comprises a cylindrical sector, the cylindrical sector comprising a first straight edge and a second straight edge extended between a proximal curved edge and a distal curved edge.

10. The mechanism of claim 7, wherein the proximal curved edge of the flexible panel is attached to a socket of the ball joint, a ball stud of the ball joint attached to the first corner of the central panel, the ball stud rotatably coupled with and disposed within the socket.

11. The mechanism of claim 10, further comprising a first plurality of single-axis hinges attached between the first edge of the central panel and the first edge of the side panel, the first plurality of single-axis hinges are configured to allow for the side panel to pivot about a pivot axis parallel with the longitudinal axis of the first edge of the central panel relative to the central panel.

12. The mechanism of claim 11, further comprising a second plurality of single-axis hinges attached between the second edge of the side panel and the first edge of the flexible panel, the second plurality of single-axis hinges are configured to allow for the flexible panel to pivot about a pivot axis parallel with the longitudinal axis of the second edge of the side panel.

13. The mechanism of claim 10, wherein the ball joint is configured to provide three rotational degrees of freedom (DOF) for the guide panel to rotate relative to the central panel, the three rotational DOFs comprising pitch, yaw, and roll.

14. The mechanism of claim 7, wherein the flexible panel comprises an elastic material, the elastic material deformable in response to the side panel pivoting with respect to the central panel.

* * * * *